United States Patent [19]

Ford

[11] Patent Number: 5,308,575
[45] Date of Patent: May 3, 1994

[54] SINTERED DENSE LASER BLOCK

[75] Inventor: Carol M. Ford, Columbia Heights, Minn.

[73] Assignee: Honeywell Inc., Minneapolis, Minn.

[21] Appl. No.: 766,997

[22] Filed: Sep. 27, 1991

[51] Int. Cl.$^5$ ............................ F27B 9/04; F27B 9/10; F27D 7/00; F27D 19/00

[52] U.S. Cl. ........................................ 419/37; 419/55; 264/63; 264/66; 372/87

[58] Field of Search ................ 419/36, 37, 38, 54, 419/55, 44, 32; 264/63, 66, 67; 372/87

[56] References Cited

U.S. PATENT DOCUMENTS

| | | | |
|---|---|---|---|
| 4,587,067 | 5/1986 | Agrawal et al. | 264/63 |
| 4,672,624 | 6/1987 | Ford | 372/87 |
| 4,865,451 | 9/1989 | Ahonen et al. | 356/350 |
| 4,926,437 | 5/1990 | Ford | 372/87 |
| 5,139,720 | 8/1992 | Takeda et al. | 264/66 |

OTHER PUBLICATIONS

Kibbe, et al., "Machine Tool Practices", 3rd Ed., John Wiley & Sons, New York 1987, pp. 739–740.

*Primary Examiner*—Donald P. Walsh
*Assistant Examiner*—Anthony R. Chi
*Attorney, Agent, or Firm*—Ronald E. Champion; Craig J. Lervick; Robert A. Pajak

[57] ABSTRACT

A sintered dense laser block constructed of ceramic metal composition manufactured through sintering, conventional machining and electro discharge machining. A ceramic metal powder and binder are combined and shaped into a laser block. The laser block is then sintered to permit electro-discharge machining. After detailed machining various subsequent firings will yield different dielectric properties for the laser block. Other laser gyro ceramic parts may be manufactured with the method of the invention such as mirror assemblies, cathodes and laser path length controllers. The electro-discharge machining permits the construction of complex ceramic shapes from a slurry of powdered ceramic metal and binder which has been extruded or shaped and then conventional machined. The resulting part is cheaper and easier to make and the electro-discharge machining provides a method of creating very complex shapes in the part.

18 Claims, 4 Drawing Sheets

T < 1000°C

T ~ 1800°C

SINTERED DENSE LASER BLOCK

This invention relates to a method of manufacturing laser gyro components and more particularly for a method of manufacturing dense laser gyro parts including a laser block using sintering and electro-discharge machining.

BACKGROUND OF THE INVENTION

A glass-ceramic is a glass that has been transformed into a solid with a high crystalline component in its microstructure. Most glasses, composed of more than 50% $SiO_2$ and other oxides, are super-cooled liquids (i.e. amorphous solids with the structure of a liquid). The absence of porosity normally found in ordinary ceramics, makes glass-ceramics strong and the inherent mixed structure makes low coefficients of thermal expansion possible.

The construction of complex components made from glass-ceramics is a difficult and expensive process. However, the advantages glass-ceramics offer, like excellent mechanical and thermal stability, often outweigh the manufacturing drawbacks. The present invention reduces or eliminates some of the manufacturing drawbacks or creating glass ceramic parts and enhances the desirability and advantages that glass-ceramics offer.

Presently, parts made from commercially available quartz-like materials, such as Cervit, Zerodur, fused silica, or glasses such as Schott Optical's BK-7 and other types of glass-ceramics, are constructed from a number of techniques including milling, boring, drilling, grinding, sanding, lapping, polishing, diffusion and lamination. Because it is difficult to produce large and complicated monolithic parts from such materials, smaller, less complicated structures are typically glued, bonded or optically sealed together in order to achieve larger complex structures.

Prior art techniques use a set of multi-stage operations to prepare complex monolithic structures. Each technique accomplishes a specific goal during the manufacturing of a structure from a blank of the unfinished material. Milling, boring and drilling serves to shape and form the ceramic into a useful shape.

For example, the successful construction of a gas filled ring laser angular rate sensor requires boring a laser cavity into a block of Cervit or Zerodur. Typically, three or more interconnected tunnels are bored within the block. Grinding, lapping and polishing serve to shape or form the surfaces of milled, bored, or drilled block features. For example, the successful preparation of the mirror structure mating surfaces at the corners of the laser gyro block can only be accomplished by grinding, lapping or polishing the surface. Mirror assemblies are bonded to mating surfaces at the corners of the block.

Ring laser angular rate sensor components may be constructed using the techniques of the invention. Prior art methods of creating ring laser angular rate sensors using a glass block created from the methods of the prior art are discussed above. In some cases, the resulting laser block has a tendency to out gas impurities from the surface of the machined cavities Prior art ring angular rate sensors block glass has tended to fracture because the glass has low thermal conductivity. Prior art laser gyro blocks must be cleaned by very harsh chemicals which have a tendency to etch the glass material of the block to remove fractures.

Due to the relatively low melting point and low coeficient of expansion of prior art glasses the types of commercial frits that may be used on the glasses have been limited. Prior art glass also suffers from the problem that the characteristics of the material are relatively undynamic and cannot be varied to fit each application. Also, prior art glass looses its memory after being exposed to excessive heat which leads to different coefficients of expansion. This in turn ruins the optical properties of the glass for its intended application. Prior art blocks also have a tendency to be relatively expensive. As a result, prior art ring laser gyroscopes built from the production method of the prior art tend to be limited in their amount of acceleration stress that the block can withstand. Also, prior art blocks cannot be cleaned with high-temperature processes that exceed 1000 degrees.

The method of the invention depends on electro-discharge machining which is a process of utilizing a conductive material and a high electric field to machine an object. Electro-discharge machining is well known in the art. A good reference material containing background material on electro-discharge machining can be found in Machine Tool Practices, Third Edition, Richard R. Kibbe, et al. John Wiley and Sons, New York 1987. pp. 739-740.

Electro-discharge machining is a non-traditional machining process involving the use of electric sparks. Electro-discharge machining removes material through the use of an electric spark generated by high energy power supply. Electro-discharge machining is known as EDM. EDM works by eroding material from a part by bringing the part close to a large potential voltage difference. The traveling of electrons from the electrode to the part erodes the part away. EDM is similar to other methods of machining in that it requires part positioning and measurement. EDM has been applied to numerical control systems thus increasing the effectiveness and precision of the results. One additional aspect of the EDM process is that the shape of the electrode dictates the features imparted in the part features eroded in the part. Electro-discharge machining electrodes are traditionally made for metal or graphite. An allied method is wirecut EDM where a wire is used as an electrode and the types of part geometry that may be machined are more intricate. The wirecut EDM works similarly to a band saw in conventional techniques.

Some ring laser gyro mirror assemblies themselves are composed of a number of glass-ceramic parts including the optical path length control (PLC) transducer mirror. The PLC transducer mirror often comprises two pieces of glass-ceramic having a common mating surface. In the current method of manufacturing PLC transducers two pieces of worked glass-ceramic are mated and bonded with an optical seal. Alternately, a bonding agent deposited on the mating surfaces such as a gold diffusion layer or a thin film of glass is used. A good discussion of such bonding techniques for transducer mirrors may be found in U.S. Pat. No. 4,865,451 to Ahonen, et al. entitled "SILICON SUBSTRATE MIRROR ASSEMBLY FOR LASERS".

Multi-layer structures manufactured in accordance with known techniques discussed hereinabove suffer from a number of disadvantages. For example, the use of a gold diffusion bond appears to result in an "aging bond," wherein bonding strength degrades with time. Further, the diffusion bonding process requires very high temperatures and pressures which may degrade the mechanical and thermal stability of the glass-ceramic material. Similarly, the use of epoxy seals, indium seals and other sealing and bonding materials result in structures with poor mechanical, electrical or optical properties.

Referring now to FIGS. 1A–1E which shows the processing steps illustrating one prior art method of creating glass-ceramic structures. The objective of the process is to create a final compound assembly using a glass-ceramic material.

As shown in FIGS. 1A and 1B, a glass-ceramic block 100 is first milled using the techniques described above. The milled surface on glass-ceramic block 102 are indicated by 101 where a milling machine has taken off glass at a slow rate to achieve a first subassembly structure 104 as shown in FIG. 1C. Referring now to FIG. 1D, the first subassembly structure 104, a second subassembly structure 106 and a gold diffusion layer 108 is shown. The second subassembly structure 106 is fabricated in the same manner as the first subassembly structure 104. In this example, a simple compound assembly is fabricated from two cylindrical disks bonded together. The bonding technique used is a traditional gold diffusion bond which is created under high temperature. Two subassemblies 104 and 106 are coated with the gold diffusion layer 108 and aligned along lines 110. The parts are then brought into intimate contact, preloaded and the temperature is raised. The increase in temperature is detrimental to the properties of the glass-ceramic as discussed above but is crucial to the construction of a bonded assembly. In the final assembly step shown in FIG. 1E, the part is created and subassembly 104 is joined to subassembly 106 by the gold diffusion bond 108. Of course, the gold diffusion bond may be replaced by using glass frits, or brazing.

The difficulty and expense of prior art methods has created a need for a new method of manufacturing glass-ceramic structures. The present invention eliminates or reduces the need for extensive machining, drilling or boring of a ceramic subassembly by working with the material in the green state and using electro-discharge machining to fashion the glass.

SUMMARY OF THE INVENTION

The method of the invention provides a method of creating ceramic structures using a novel sintered technique utilizing electro-discharge machining. The method of the invention begins by pressing a ceramic metal powder under pressure into a green state utilized in combination with a binder. The method proceeds by rough machining the green state material into an intermediate shape or the extrusion of the material into a mold. The structure is exposed to a heating cycle and after heating is electro-discharge machined to the desired shape. The material may then be baked at a higher temperature for a longer time and converted into a dielectric.

It is one object of the invention to provide an improved ceramic that is very hard and resists fracturing.

It is a further object of the invention to provide an improved high strength improved ring laser gyro block that can withstand very high G forces.

It is a further object of the invention to provide an improved monolithic laser angular rate sensor that is constructed with a monolithic body.

It is yet another object of the invention to employ a wide variety of glass frits that includes high temperature frits.

It is a further object of the invention to provide an improved flexible ceramic manufacturing technique that allows the creation of complex ceramic parts.

It is a further object of the invention to provide an improved ceramic that minimizes the change in its coefficient of expansion after being exposed to heat.

It is yet a further object of the invention to provide an improved glassed ceramic structure that can be brought into high temperature environments where organic impurities will bake out.

It is yet another object of the invention to provide an improved glass-ceramic machining process using electro-discharge machining.

It is yet a further object of the invention to provide an improved ring laser gyro block that is less expensive and easier to manufacture.

It is yet a further object of the invention to provide a improved ring laser gyro mirror which matches the thermal expansion of the ring laser block.

It is still a further object of the invention to provide a laser gyro that allows the use of a high temperature frits to bond laser mirrors to a laser block.

It is yet another object of the invention to provide an improved method of creating ceramic structures that allow the use of high temperature bonding methods.

It is yet a further object of the invention to provide an improved laser block that can be cleaned with many different types of commercially available solvents.

It is yet a further object of the invention to provide an improved laser block that has a lower quantity of outgassing.

It is yet another object of the invention to preserve the excellent thermal coefficient properties of the glass-ceramic throughout the manufacturing process of complex glass-ceramic structures.

Other objects, features and advantages of the present invention will become apparent to those skilled in the art through the Description of the Preferred Embodiment, Claims, and drawings herein wherein like numerals refer to like elements.

BRIEF DESCRIPTION OF THE DRAWINGS

To illustrate the invention, a preferred embodiment of this invention will be described hereinafter with reference to the accompanying drawings. The preferred embodiment concerns a method of manufacturing a sintered dense laser block.

DESCRIPTION OF THE PREFERRED EMBODIMENT

Figure 1A:
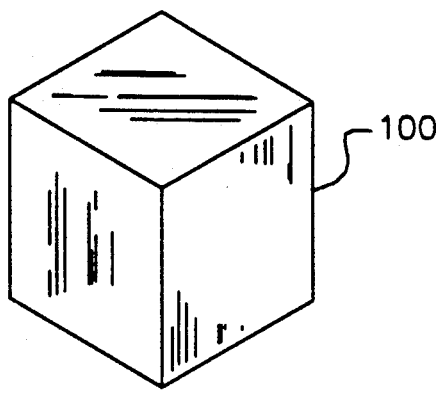
FIGS. 1A–1E are process diagrams showing the various stages of one method of manufacturing glass-ceramic final assemblies known to the prior art.
Figure 1B:
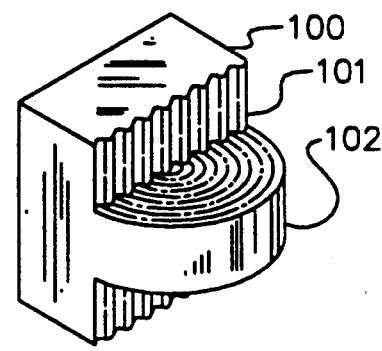
Figure 1C:
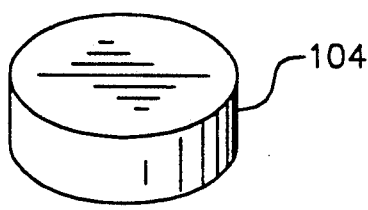
Figure 1D:
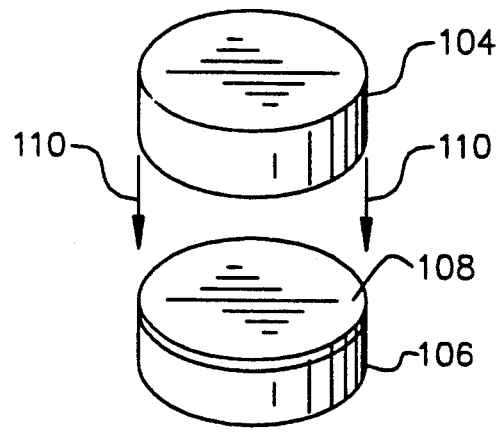
Figure 1E:
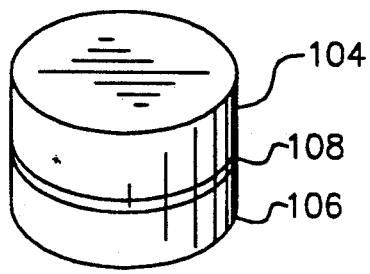
Figure 2A:
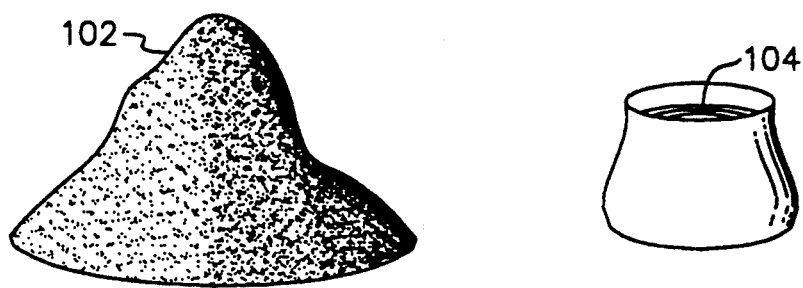
FIGS. 2A–2F are process diagrams illustrating one method of creating glass-ceramic final assemblies in accordance with the instant invention.

Referring now to FIG. 2A which shows the elements of the ceramic prior to operation of the method of the invention. A ceramic powder 102 comprising the ceramics of Table 1 is shown along with a binder 104. The ceramics that are good candidates for use in the invention are listed in Table 1.

TABLE 1

Titanium Carbide-Al (TiC—Al),
Boron Carbide/Zirconium reacted cermet material low metal content form (B$_4$C + Zr - ZrC—ZrB$_2$),
Boron Carbide/Zirconium reacted cermet material high metal content form (B$_4$C + Zr - ZrC—ZrB$_2$),
Silicon Nitride (Si$_3$N$_4$),
Titanium DiBoride (TiB$_2$),
Titanium Carbide (TiC),
Aluminum Oxide (Al$_2$O$_3$),
Magnesium Oxide (MgO),
Gadolinium Oxide (Gd$_2$O$_3$), and
Magnesium Aluminate (MgAl$_2$O$_4$, spinel).

Figure 2B:
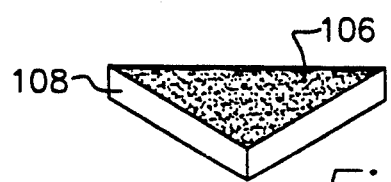
Figure 2C:
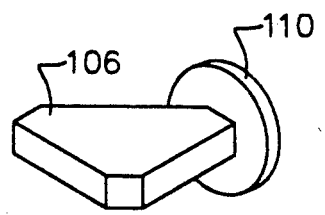

The process of making powdered ceramic materials of the invention flows to FIG. 2B where the powder 102 and binder 104 are combined into a powder/binder mix 106 and placed in a mold 108. Those skilled in the art will appreciate that the powder 102 and binder 104 could be extruded into the mold or pressed into the mold. The process then flows to FIG. 2C where the material, the combined powder and binder 106 has mixed to form a ceramic that is in the green state 106. The binder 104 could either consist of, for example, water or a resin material as shown in FIG. 2C. The green state ceramic 106 can be rough machined at this stage in processing. The rough machining can be accomplished by the methods outlined in the description of FIG. 1.

Figure 2D:
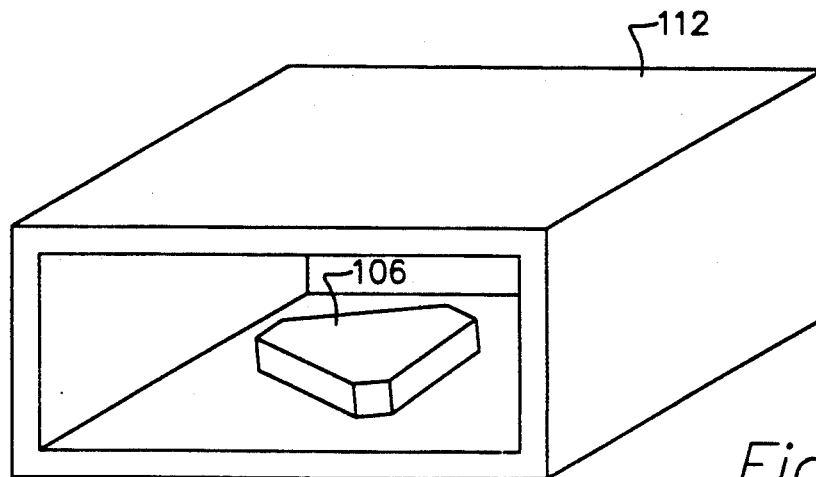

Referring now to FIG. 2D the green state ceramic 106 is baked in an oven 112 at less than 1000 degrees but greater than 400 degrees. The green state ceramic 106 will come out of the baking process a conductor of electricity. The method of the invention allows the green state ceramic 106 to then be baked at a higher temperature at a later time.

Figure 2E:
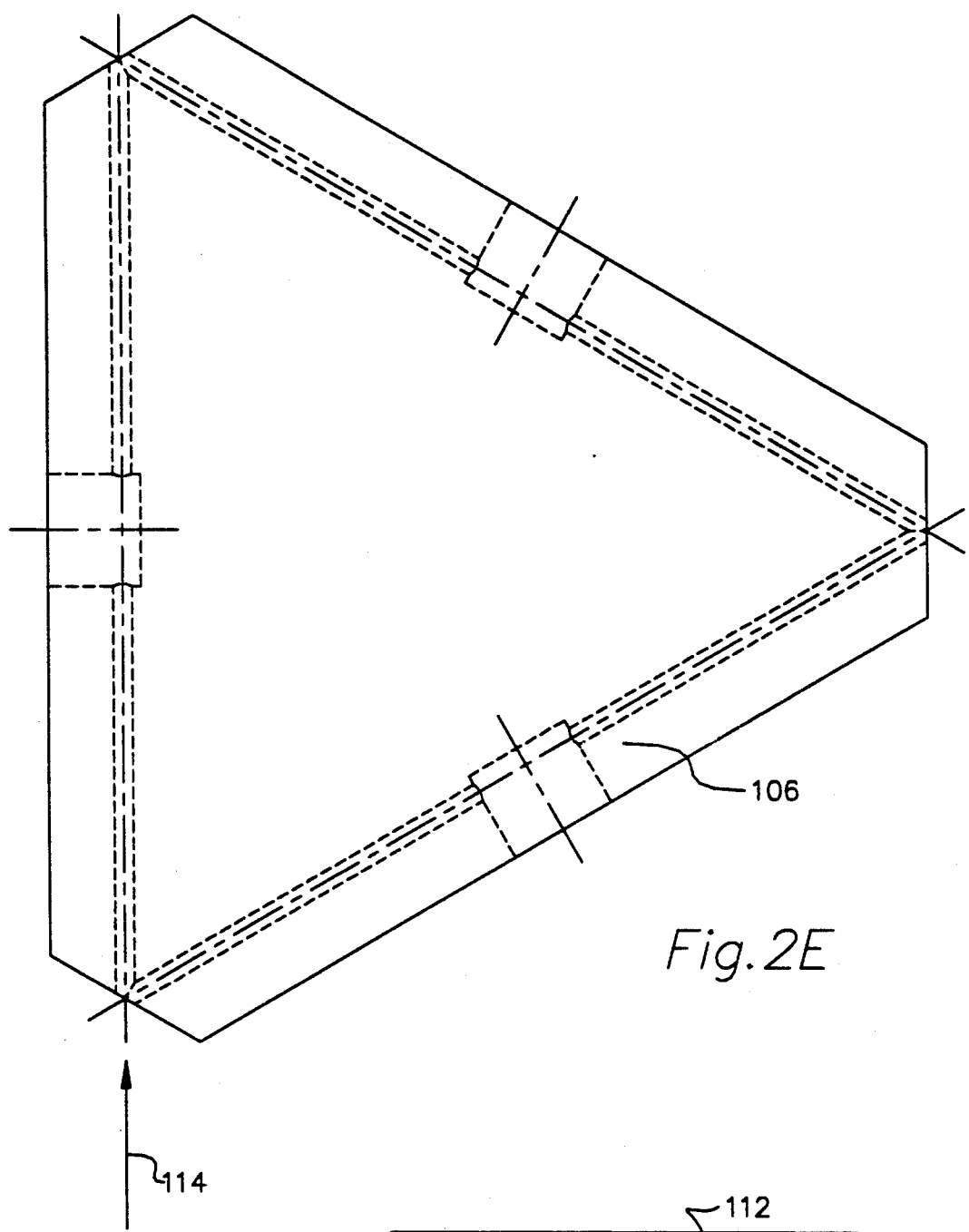

Referring now to FIG. 2E in which the green state block 106 is further machined using various techniques including electro-discharge machining. A good description of electro-discharge machining 114 can be found in the aforereferenced book.

Figure 2F:
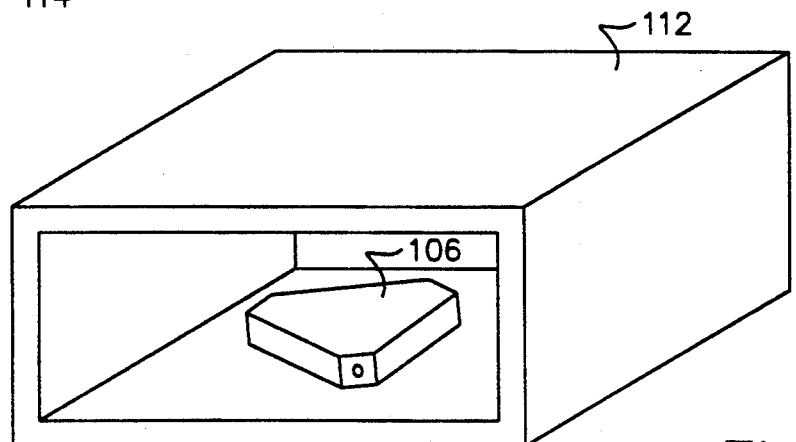

Referring now to FIG. 2F in which the green state ceramic 106 is placed in oven 112 again, however, in this step of the method of the invention, the green state ceramic is now brought to a temperature much higher, approximately 1800° C.

Figure 3:
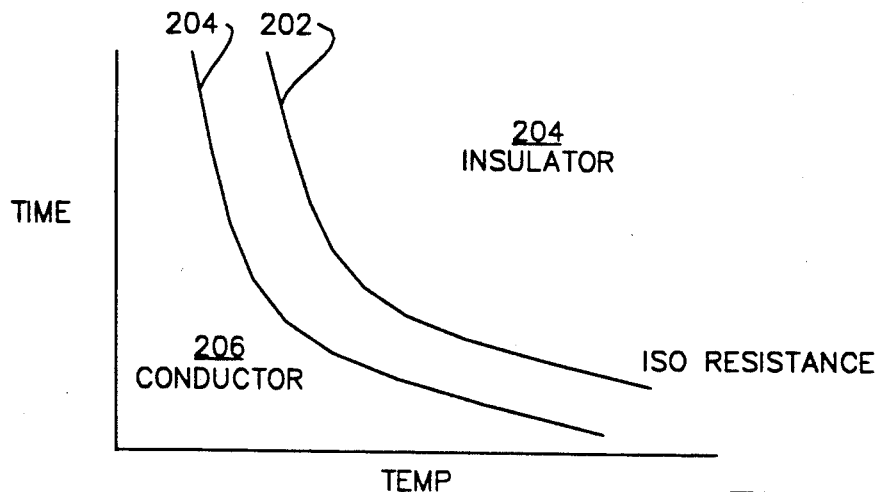
FIG. 3 is a time vs. temperature diagram of one method of the invention.

Referring now to FIG. 3, an iso-resistance diagram is shown which illustrates the affect of time verses temperature baking of the green state ceramic 106. Iso-resistance line 202 and 204 show the boundaries of a meta-region or the region in which the green state ceramic 106 makes a transition from a conductor to an insulator. In the various combinations of baking time and baking temperature the ceramic will achieve the insulator state 204 and for other combinations of time and temperature the ceramic 106 will achieve the conductor state 206. The method of the invention exploits the fact that at a high temperature it requires less time to achieve the insulator state.

Figure 4:
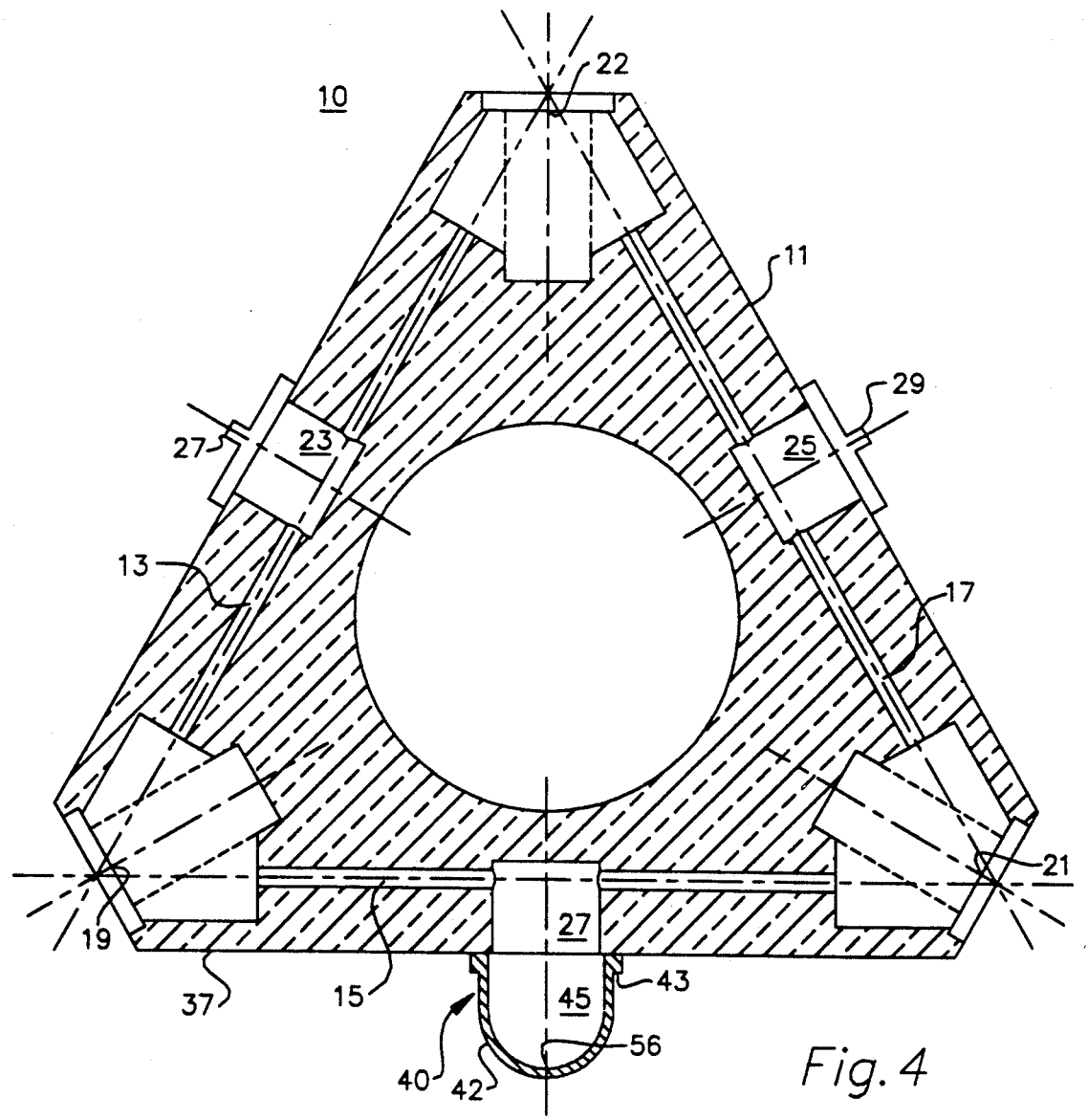
FIG. 4 is a cross section view of a sintered dense laser block made in accordance with the invention.

Referring now to FIG. 4 a diagram of the method of the invention is shown having produced a ring laser gyro block. The advantages of the invention for the creation of the ring laser gyro block are many. Primarily the method of the invention will create a dense ring laser block that has very few impurities. The laser block is also in very good dielectric which reduces the skin effect that is associated with prior art laser gyro blocks. The method of the invention results in a very hard gyro block that will not fracture like blocks made according to prior art methods. The gyro block 300 can withstand very high G rates because the block is made of a very hard and dense material after the firing and step 2F. The gyro block is created from a monolithic body and as such is less resistent to structural failure and the manufacturing defects of a polylithic body. The method of the invention allows the use of a wider variety of commercial frits to bond other components of the laser gyro block. Anodes, cathodes and mirrors can be bonded with extremely high temperature frits, a gold seal, by optical contact or by brazing. Frits at high temperature are typically stronger than low temperature frits and better match the thermal and mechanical properties of the block, mirrors, cathodes and anodes. The method of the invention allows the creation of a more flexible custom design by the adjustment of material properties at the powder stage of the process. The method of the invention also creates a gyro block that is more dimensionally stable over time and over a heating range. Prior art blocks have a tendency to change their coefficient of expansion after heating. The very hard and dense block made in accordance with the invention results in a more thermally stable gyro block. The method of the invention provides a laser gyro block that also has less tendency to out gas into the laser cavity in which out-gassing material has a tendency to interfere with the laser.

The high temperature frits that may be used in the bonding of the mirrors to the laser gyro block have been determined to be frits from Corning Company called Corning 7052 Kovar matching frits or 9119 Kovar matching frits or 9015 Kovar matching frits all from the Corning Company of New York.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What the claimed is:

1. A method of constructing ceramic shapes from a ceramic metal powder and binder comprising the steps of:
   (a) mixing a ceramic and metal powder and binder to yield a powder and binder combination;
   (b) forming the powder and binder combination into a part with a desired shape;
   (c) machining the part;
   (d) baking the part at a temperature hot enough to form a ceramic metal but not hot enough to bake off the metal mixed in the ceramic;
   (e) electro-discharge machining the part into a desired shape; and
   (f) baking the part in an oven at a temperature hot enough to drive off the metal mixed with the ceramic to create a part with a predetermined dielectric constant.

2. A laser gyro block made in accordance with the method of claim 1.

3. A mirror substrate for a laser gyro made in accordance with the method of claim 1.

4. A laser gyro path length control transducer made in accordance with the method of claim 1.

5. The method of claim 1 wherein the step of forming the powder and binder combination into a part with a desired shape is done by extrusion.

6. The method of claim 1 where the ceramic is selected from the group consisting of Titanium Carbide-Al, Boron Carbide/Zirconium reacted cermet material low metal content form, Boron Carbide/Zirconium reacted cermet material high metal content form, Silicon Nitride, Titanium DiBoride, Titanium Carbide, Aluminum Oxide, Magnesium Oxide, Gadolinium Oxide, and Magnesium Aluminate.

7. A method of constructing a ring laser gyro from a ceramic metal powder and binder, wherein the ring laser gyro comprises a thermally and mechanically stable block having a plurality of interconnected gas containing tunnels forming an optical closed-loop path cavity therein and at least one anode mount on said block and a cathode mount on said block, and wherein the method of constructing the ring laser gyro comprises the steps of:
(a) mixing a ceramic and metal powder and binder to yield a powder and binder combination;
(b) forming the powder and binder combination into the rough shape of the block;
(c) baking the block at a temperature hot enough to form a ceramic metal but not hot enough to bake off the metal mixed in the ceramic;
(d) electro-discharge machining the plurality of interconnected gas containing tunnels, anode mounts and cathode mounts; and
(e) baking the block in an oven at a temperature hot enough to drive off the metal mixed with the ceramic to create a block with a predetermined dielectric constant.

8. The method of claim 7 where the ceramic metal is selected from the group consisting of Titanium Carbide-Al, Boron Carbide/Zirconium reacted cermet material low metal content form ($B_4C+Zr\rightarrow ZrC-ZrB_2$), Boron Carbide/Zirconium reacted cermet material high metal content form ($B_4C+Zr\rightarrow ZrC-ZrB_2$), Silicon Nitride ($Si_3N_4$), Titanium DiBoride ($TiB_2$), Titanium Carbide (TiC), Aluminum Oxide ($Al_2O_3$), Magnesium Oxide (MgO), Gadolinium Oxide ($Gd_2O_3$), and Magnesium Aluminate ($MgAl_2O_4$, spinel).

9. The method of claim 7 wherein the step of forming the powder and binder combination into a rough shape of the block is done by extrusion.

10. A method of constructing a cathode from a ceramic metal powder and binder, wherein the method of constructing the cathode comprises the steps of:
(a) mixing a ceramic and metal powder and binder to yield a powder and binder combination;
(b) forming the powder and binder combination into the rough shape of the cathode;
(c) machining more details of the cathode;
(d) baking the cathode at a temperature hot enough to form a ceramic metal but not hot enough to bake off the metal mixed in the ceramic;
(e) electro-discharge machining the cathode; and
(f) baking the cathode in an oven at a temperature hot enough to drive off the metal mixed with the ceramic to create a cathode with a predetermined dielectric constant.

11. The method of claim 10 where the ceramic metal is selected from the group consisting of Titanium Carbide-Al, Boron Carbide/Zirconium reacted cermet material low metal content form, Boron Carbide/Zirconium reacted cermet material high metal content form, Silicon Nitride, Titanium DiBoride, Titanium Carbide, Aluminum Oxide, Magnesium Oxide, Gadolinium Oxide, and Magnesium Aluminate.

12. The method of claim 10 wherein the step of forming the powder and binder combination into a rough shape of the cathode is done by extrusion.

13. A method of constructing a path length controller from a ceramic metal powder and binder, wherein the method of constructing the path length controller comprises the steps of:
(a) mixing a ceramic and metal powder and binder to yield a powder and binder combination;
(b) forming the powder and binder combination into the rough shape of the path length controller;
(c) machining more details of the path length controller;
(d) baking the path length controller at a temperature hot enough to form a ceramic metal but not hot enough to bake off the metal mixed in the ceramic;
(e) electro-discharge machining the path length controller; and
(f) baking the path length controller in an oven at a temperature hot enough to drive off the metal mixed with the ceramic to create a path length controller with a predetermined dielectric constant.

14. The method of claim 10 where the ceramic metal is selected from the group consisting of Titanium Carbide-Al, Boron Carbide/Zirconium reacted cermet material low metal content form, Boron Carbide/Zirconium reacted cermet material high metal content form, Silicon Nitride, Titanium DiBoride, Titanium Carbide, Aluminum Oxide, Magnesium Oxide, Gadolinium Oxide, and Magnesium Aluminate.

15. The method of claim 10 wherein the step of forming the powder and binder combination into a rough shape of the path length controller is done by extrusion.

16. A method of constructing a laser gyro mirror assembly from a ceramic metal powder and binder, wherein the method of constructing the laser gyro mirror assemblies comprises the steps of:
(a) mixing a ceramic and metal powder and binder to yield a powder and binder combination;
(b) forming the powder and binder combination into the rough shape of the laser gyro mirror assembly;
(c) baking the laser gyro mirror assembly at a temperature hot enough to form a ceramic metal but not hot enough to bake off the metal mixed in the ceramic;
(d) electro-discharge machining laser gyro mirror assembly; and
(e) baking the laser gyro mirror assembly in an oven at a temperature hot enough to drive off the metal mixed with the ceramic to create a laser gyro mirror assembly with a predetermined dielectric constant.

17. The method of claim 10 where the ceramic metal is selected from the group consisting of Titanium Carbide-Al, Boron Carbide/Zirconium reacted cermet material low metal content form, Boron Carbide/Zirconium reacted cermet material high metal content form, Silicon Nitride, Titanium DiBoride, Titanium Carbide, Aluminum Oxide, Magnesium Oxide, Gadolinium Oxide, and Magnesium Aluminate.

18. The method of claim 10 wherein the step of forming the powder and binder combination into a rough shape of the laser gyro mirror assemblies is done by extrusion.

* * * * *